United States Patent
Ogi et al.

(10) Patent No.: US 12,432,643 B2
(45) Date of Patent: Sep. 30, 2025

(54) WIRELESS COMMUNICATION CONTROL DEVICE, WIRELESS COMMUNICATION DEVICE, AND WIRELESS COMMUNICATION CONTROL METHOD

(71) Applicant: DENSO CORPORATION, Kariya (JP)

(72) Inventors: Yosuke Ogi, Kariya (JP); Masayuki Hoshino, Kariya (JP)

(73) Assignee: DENSO CORPORATION, Kariya (JP)

( * ) Notice: Subject to any disclaimer, the term of this patent is extended or adjusted under 35 U.S.C. 154(b) by 444 days.

(21) Appl. No.: 18/165,034

(22) Filed: Feb. 6, 2023

(65) Prior Publication Data

US 2023/0180103 A1 Jun. 8, 2023

Related U.S. Application Data

(63) Continuation of application No. PCT/JP2021/030491, filed on Aug. 20, 2021.

(30) Foreign Application Priority Data

Sep. 14, 2020 (JP) .................. 2020-153989

(51) Int. Cl.
*H04W 48/04* (2009.01)
*H04W 74/0808* (2024.01)

(52) U.S. Cl.
CPC ....... *H04W 48/04* (2013.01); *H04W 74/0808* (2013.01)

(58) Field of Classification Search
CPC .......................... H04W 48/04; H04W 74/0808

USPC ........................................... 370/329
See application file for complete search history.

(56) References Cited

U.S. PATENT DOCUMENTS

| 2013/0308470 A1* | 11/2013 | Bevan ................. H04W 36/322 370/252 |
| 2016/0080235 A1* | 3/2016 | Tan ......................... H04L 67/12 370/235 |

FOREIGN PATENT DOCUMENTS

JP 2013197831 A 9/2013

OTHER PUBLICATIONS

U.S. Appl. No. 18/165,092, filed Feb. 6, 2023, Ogi et al.

* cited by examiner

*Primary Examiner* — Chuck Huynh
(74) *Attorney, Agent, or Firm* — Harness, Dickey & Pierce, P.L.C.

(57) ABSTRACT

By a wireless communication control device that controls a wireless communication device or a wireless communication control method, identification information for identifying the access point of a target network existing on a route of a vehicle is acquired, an on-route access point of the target network on the route is identified, communication status information regarding a communication status in a target communication range to which the vehicle comes close is acquired, and a frequency channel with less interference in wireless communication in the target communication range is predicted.

12 Claims, 8 Drawing Sheets

US 12,432,643 B2

WIRELESS COMMUNICATION CONTROL DEVICE, WIRELESS COMMUNICATION DEVICE, AND WIRELESS COMMUNICATION CONTROL METHOD

CROSS REFERENCE TO RELATED APPLICATIONS

The present application is a continuation application of International Patent Application No. PCT/JP2021/030491 filed on Aug. 20, 2021, which designated the U.S. and claims the benefit of priority from Japanese Patent Application No. 2020-153989 filed on Sep. 14, 2020. The entire disclosures of all of the above applications are incorporated herein by reference.

TECHNICAL FIELD

The present disclosure relates to a wireless communication control device, a wireless communication device, and a wireless communication control method.

BACKGROUND

It has been known that a wireless network is connected via a wireless communication with an access point of a wireless network, and information is transmitted and received. As a comparative example, there is a technology that, before reaching a forward point set to a prediction target, predicts interference channels by using communication status information in order to avoid interference in advance. Further, as the comparative example, there is a technology in which a wireless communication device of a subject vehicle directly acquires, via an inter-vehicle communication, communication status information obtained by channel scanning or the like of a wireless communication device of a different vehicle, or indirectly acquires the communication status information via a server or the like.

SUMMARY

By a wireless communication control device that controls a wireless communication device or a wireless communication control method, identification information for identifying the access point of a target network existing on a route of a vehicle is acquired, an on-route access point of the target network on the route is identified, communication status information regarding a communication status in a target communication range to which the vehicle comes close is acquired, and a frequency channel with less interference in wireless communication in the target communication range is predicted.

DETAILED DESCRIPTION

Figure 1:
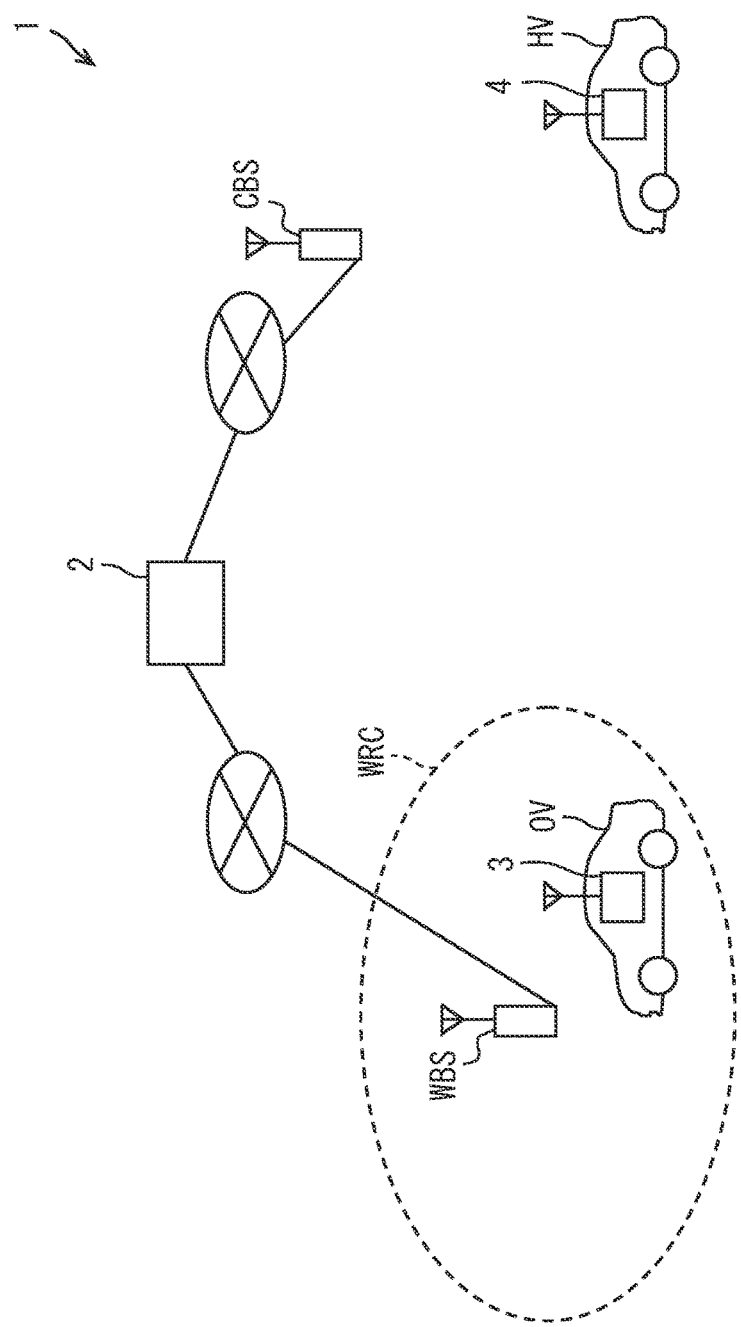
FIG. 1 is a diagram showing one example of a schematic configuration of a vehicle communication system.

However, in the technologies of the comparative example, a prediction accuracy of the frequency channel with less interference decreases. The details are described as follows.

In the comparative example, it is not assumed that a timing of acquiring the communication status information is limited. Accordingly, when the wireless communication device of the subject vehicle attempts to acquire the communication status information via the server or the like, the communication status information can be acquired even in a situation in which the current position is far from the forward point (hereinafter, target point) set to the prediction target. There is a high possibility that the communication status information acquired at the point far from the target point may be largely different from communication status information at the time when the subject vehicle reaches the target point since the communication status at the target point is constantly changing. In this case, there is a high possibility that the prediction accuracy of the interference channel predicted using the communication status information will also be low.

Further, the wireless communication device of the subject vehicle acquires the communication status information by the inter-vehicle communication when a distance between the subject vehicle and the different vehicle becomes a distance enabling the wireless communication device to perform the inter-vehicle communication with a wireless communication device of the different vehicle positioned at the target point. The distance enabling the inter-vehicle communication is several hundred meters. Therefore, even in a case of the communication status information acquired by the inter-vehicle communication, the communication status information is largely different from communication status information at the time when the subject vehicle reaches the target point. As the result, there is a high possibility that the prediction accuracy of the interference channel will be low.

The present disclosure provides a wireless communication control device, a wireless communication device, and a wireless communication control method capable of high accurately predicting a frequency channel with less interference in a communication range of an access point before reaching the communication range of the access point of a wireless network.

According to one example embodiment, a wireless communication control device controls a wireless communication device that is mounted on a vehicle and transmits and receives information via wireless communication with an access point of a wireless network. The wireless communication control device includes: an identification information acquisition unit that acquires identification information for identifying the access point of a target network that is a predetermined wireless network existing on a route of the vehicle; a point identification unit that identifies an on-route access point that is the access point of the target network on the route of the vehicle by using the identification information acquired by the identification information acquisition unit; a communication status acquisition unit that acquires communication status information regarding a communication status in a target communication range that is a communication range to which the vehicle comes close, via wireless communication other than the wireless communication with the access point of the target network, at a timing when the vehicle comes close to a communication range of the on-route access point identified by the point identification unit; and a prediction unit that predicts a frequency channel with less interference in the wireless communication in the target communication range by using the communication status information acquired by the communication status acquisition unit.

Further, according to another example embodiment, a wireless communication control method is executed by at least one processor and controls a wireless communication device that is mounted on a vehicle and transmits and receives information via wireless communication with an access point of a wireless network. The method includes: acquiring identification information for identifying the access point of a target network that is a predetermined wireless network existing on a route of the vehicle; identifying an on-route access point that is the access point of the target network on the route of the vehicle by using the acquired identification information; acquiring communication status information regarding a communication status in a target communication range that is a communication range to which the vehicle comes close, via wireless communication other than the wireless communication with the access point of the target network, at a timing when the vehicle comes close to a communication range of the identified on-route access point; and predicting a frequency channel with less interference in the wireless communication in the target communication range by using the acquired communication status information.

According to the above configuration, the frequency channel with less interference is predicted by the wireless communication in the target communication range that is the communication range to which the vehicle comes close, with use of the communication status information acquired at the timing when the vehicle comes close to the communication range of the on-route access point of the identified target network. Accordingly, it may be possible to predict the frequency channel with less interference in the communication range before the vehicle reaches the communication range of the access point of the wireless network. Further, since the communication status information is acquired at the timing when the vehicle comes close to the target communication range, it may be possible to reduce a time period from the time of acquiring the communication status information to the time when the vehicle enters the target communication range. Accordingly, it may be possible to reduce the divergence between the acquired communication status information and the communication status information at the time of entering the target communication range. Hence, it may be possible to suppress deterioration in prediction accuracy of the frequency channel with less interference in the wireless communication in the target communication range. As the result, it may be possible to high accurately predict the frequency channel with less interference in the communication range of the access point of the wireless network before reaching the communication range of the access point.

Furthermore, according to another example embodiment, a wireless communication device is mounted on a vehicle and is transmits or receives information via wireless communication with an access point of a wireless network. The device includes: a first communication unit that performs the wireless communication with the access point; a second communication unit that performs wireless communication other than the wireless communication with the access point; and the wireless communication control device described above.

According to this, since the described-above wireless communication control device is included, it may be possible to high accurately predict the frequency channel with less interference in the communication range of the access point before the vehicle reaches the communication range of the access point of the wireless network.

The following will describe embodiments of the present disclosure with reference to the accompanying drawings. For convenience of description, among multiple embodiments, a configuration having the same function as a configuration shown in the drawings and described in the previous embodiment may be indicated by the same reference symbol, and the description thereof may be omitted. For the configuration having the same reference symbol as in the previous embodiment, detailed description may be omitted in other embodiments.

First Embodiment

<Schematic Configuration of Vehicle Communication System>

Hereinafter, a present embodiment will be described with reference to the drawings. First, a vehicle communication system 1 will be described with reference to FIG. 1. As shown in FIG. 1, the vehicle communication system 1 includes a server 2, a wireless communication device 3 used for a vehicle OV, and a vehicle unit 4 used for a vehicle HV. It is assumed that the vehicle HV is the subject vehicle. It is assumed that the vehicle OV is a different vehicle other than the subject vehicle. Multiple vehicles OV may be provided. Alternatively, the vehicle communication system 1 may not include the wireless communication device 3. A WBS in FIG. 1 indicates a base station for Wi-Fi (registered trademark). That is, the base station WBS corresponds to a Wi-Fi access point. The Wi-Fi access point can be also referred to as a Wi-Fi spot. A WRC in FIG. 1 indicates a communication range of the base station WBS. A CBS in FIG. 1 indicates a base station for cellular communication.

The server 2 receives data transmitted from the vehicle unit 4. Further, the server 2 transmits data to the vehicle unit 4. The server 2 may be provided by one server or multiple servers. For example, a server 2 receiving the data from the vehicle unit 4 may be different from a server 2 transmitting data to the vehicle unit 4. The server 2 may be, for example, a server on the cloud or a distributed network such as a block chain.

The wireless communication device 3 can perform communication by connecting with at least the Wi-Fi network. That is, the wireless communication device 3 connects with the Wi-Fi network by performing wireless communication with the base station WBS in accordance with a communication standard of a wireless LAN corresponding to the Wi-Fi in a communication range WRC of the base station WBS. The wireless communication device 3 acquires, in the communication range WRC, information regarding communication status indicating a radio wave used in the communication range WRC or the like by using, for example, channel scan or the like. Further, it is assumed that the wireless communication device 3 can transmit information related acquired communication status by, for example, the inter-vehicle communication.

The vehicle unit 4 performs data communication with the server 2. The vehicle unit 4 transmits, for example, data obtained by traveling of the subject vehicle HV to the server 2. Examples of the data transmitted to the server 2 include data of a captured image obtained by a surrounding monitoring camera of the subject vehicle, or the like. Such the captured image data is used for map generation, machine learning, or the like. Further, the vehicle unit 4 receives data necessary for the subject vehicle HV from the server 2. Examples of the data received from the server 2 include update data of a firmware of an ECU of the subject vehicle HV or the like. Details of the vehicle unit 4 will be described below.

<Schematic Configuration of Vehicle Unit>

Figure 2:
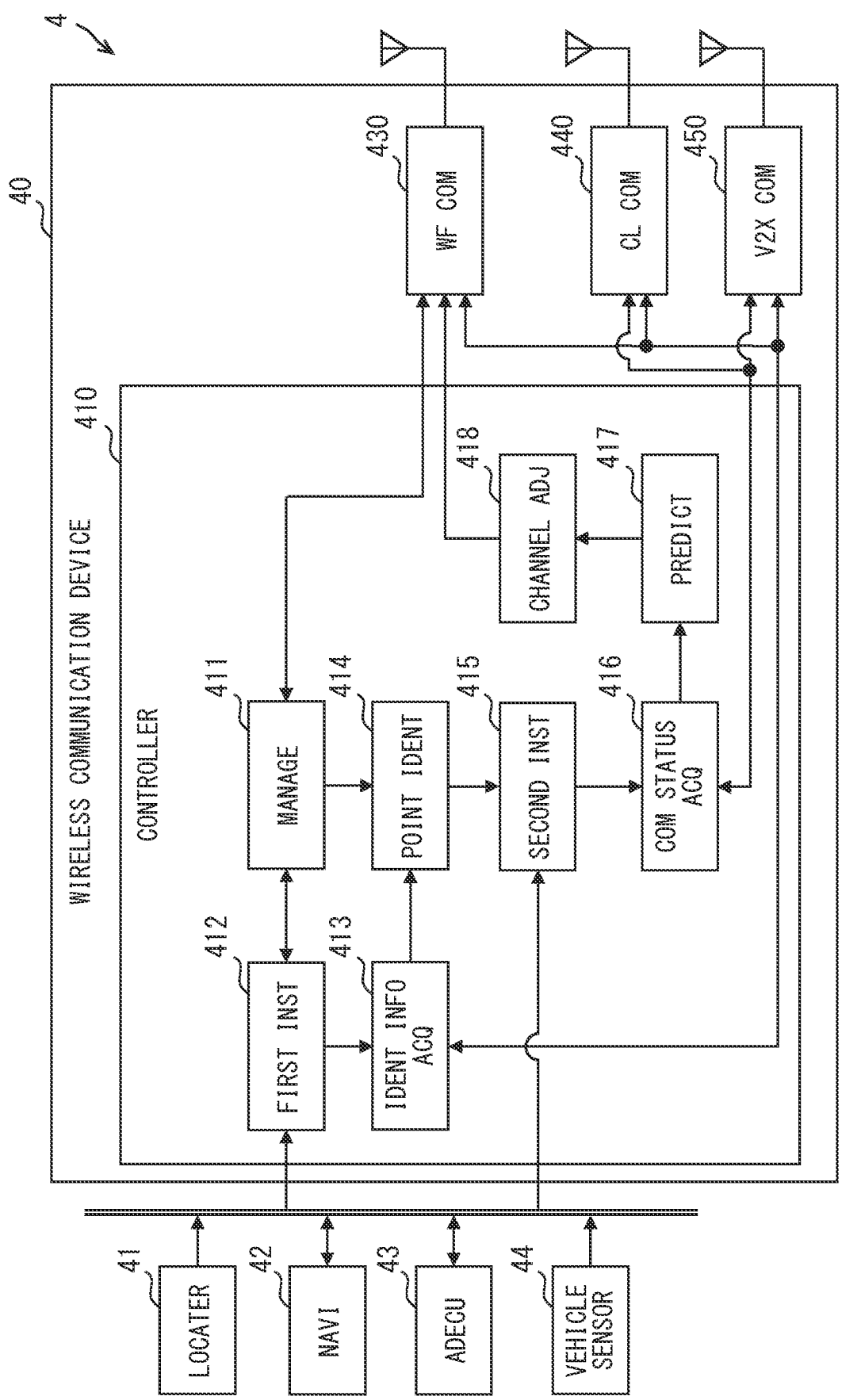
FIG. 2 is a diagram showing one example of schematic configurations of a vehicle unit and a wireless communication device.

Next, a schematic configuration of the vehicle unit 4 will be described with reference to FIG. 2. As shown in FIG. 2, the vehicle unit 4 includes a wireless communication device 40, a locator 41, a navigation device (hereinafter, NAVI) 42, an automatic driving ECU (hereinafter, ADECU) 43, and a vehicle sensor 44. Hereinafter, a vehicle on which the vehicle unit 4 is mounted is referred to as the subject vehicle. The wireless communication device 40, the locator 41, the NAVI 42, the ADECU 43, and the vehicle sensor 44 may be connected to each other by an in-vehicle LAN, for example.

The locator 41 includes a GNSS (Global Navigation Satellite System) receiver and an inertial sensor. The GNSS receiver receives positioning signals from multiple positioning satellites. The inertial sensor includes a gyro sensor and an acceleration sensor, for example. The locator 41 sequentially measures a vehicle position of the subject vehicle HV by combining the positioning signals received by the GNSS receiver and the measurement results of the inertial sensor. The vehicle position may be measured based on a traveling distance obtained from detection results sequentially output from a vehicle speed sensor mounted on the subject vehicle HV.

The NAVI 42 provides route guidance to guide a user of the subject vehicle to the set destination. The destination of the subject vehicle HV may be set according to an operation input received from the user via an operation input unit, for example. As for a departure point, for example, the current position of the subject vehicle may be set as the departure point. The NAVI 42 searches a recommendation route from the departure point to the destination, and provides route guidance using the searched recommendation route.

The ADECU 43 recognizes a traveling environment of the subject vehicle by using the sensing result of the surrounding monitoring sensor of the subject vehicle HV. In one example, the ADECU 43a generates a virtual space that reproduces an actual travelling environment in three dimensions. Further, the ADECU 43 determines a traveling schedule of the subject vehicle based on the recognized traveling environment. In one example, the ADECU 43 determines, as a medium- to long-term traveling schedule, a recommendation route for directing the subject vehicle HV to the destination. Further, the ADECU 43 determines, as a short term traveling schedule, execution of steering for lane keeping and lane change, acceleration and deceleration for speed adjustment, sudden braking for collision avoidance, or the like. The ADECU 43 executes an autonomous driving function of acting as a driving operation by a driver by performing traveling control of the vehicle according to the determined traveling schedule. The ADECU 43 may control traveling in cooperation with an ECU controlling the vehicle.

The vehicle sensor 44 is a sensor group for detecting various states of a subject vehicle HV. The vehicle sensor 44 includes a vehicle speed sensor for detecting a vehicle speed of the subject vehicle HV. The vehicle sensor 44 outputs the detected sensing information to the in-vehicle LAN. Note that the sensing information detected by the vehicle sensor 44 may be output to the in-vehicle LAN via the ECU mounted on the subject vehicle HV.

The wireless communication device 40 transmits and receives information via the wireless communication. The wireless communication device 40 communicates with the server 2 via a public communication network, a base station, and the like. Further, the wireless communication device 40 communicates with the wireless communication device 3 of the different vehicle OV via the inter-vehicle communication, and communicates with a roadside device via road-to-vehicle communication. Details of the wireless communication device 40 will be described below.

<Schematic Configuration of Wireless Communication Device>

Next, a schematic configuration of the wireless communication device 40 will be described with reference to FIG. 2. As shown in FIG. 2, the wireless communication device 40 includes the controller 410, a Wi-Fi communication unit (hereinafter, WF communication unit) 430, a cellular communication unit (hereinafter, CL communication unit) 440, and a V2X communication unit 450. In the drawings, the WF communication unit 430 may be also referred to as "WF COM", the CL communication unit 440 may be also referred to as "CL COM", and the V2X communication unit 450 may be also referred to as "V2X COM".

The WF communication unit 430 communicates with the server 2 via the base station WBS of the Wi-Fi and the internet. That is, the WF communication unit 430 communicates with the server 2 by connecting to the Wi-Fi network. This communication is hereinafter referred to as Wi-Fi communication. Note that the WF communication unit 430 corresponds to a first communication unit. The Wi-Fi communication is possible within the communication range WRC of the base station WBS.

The CL communication unit 440 communicates with the server 2 via the base station CBS of the cellular communication and the internet. That is, the CL communication unit 440 communicates with the server 2 by connecting to a cellular network. This communication is referred to as cellular communication. Note that the CL communication unit 440 corresponds to a second communication unit. The cellular communication includes communication using cellular lines such as LTE (Long Term Evolution) and 5G.

The V2X communication unit 450 communicates with the wireless communication device 3 of the different vehicle OV via the inter-vehicle communication, and communicates with the roadside device via the road-to-vehicle communication. These communications are hereinafter referred to as V2X communication. The inter-vehicle communication may be inter-vehicle communication using the 5.8 GHz band or inter-vehicle communication using the 700 MHz band. A communication distance of inter-vehicle communication using the 5.8 GHz band is about several tens of meters. A communication distance of inter-vehicle communication using the 700 MHz band is about several hundred meters.

The controller 410 includes, for example, a processor, a memory, an I/O, and a bus connecting these components, and executes various processes related to transmission and reception of data by executing a control program stored in the memory. The memory referred to here is a non-transitory tangible storage medium, and stores programs and data that can be read by a computer. The non-transitory tangible storage medium is implemented by a semiconductor memory or the like. Details of the controller 410 will be described below.

<Schematic Configuration of Controller>

Next, a schematic configuration of the controller 410 will be described with reference to FIG. 2. As shown in FIG. 2, the controller 410 includes a management unit 411, a first instruction unit 412, an identification information acquisition unit 413, a point identification unit 414, a second instruction unit 415, a communication status acquisition unit 416, a prediction unit 417, and a channel adjustment unit 418 as functional blocks. A part or all of the functions executed by the controller 410 may be configured in hardware by one or multiple ICs or the like. A part or all of the functional blocks included in the controller 410 may be implemented by executing software by a processor and a combination of hardware members. This controller 410 corresponds to a wireless communication control device. Execution of the process of each functional block of the controller 410 by the computer corresponds to execution of the wireless communication control method. In the drawings, the management unit 411 may be also referred to as "MANAGE", the first instruction unit 412 may be also referred to as "FIRST INST", the identification information acquisition unit 413 may be also referred to as "IDENT INFO ACQ", the point identification unit 414 may be also referred to as "POINT DENT", the second instruction unit 415 may be also referred to as "SECOND INST", the communication status acquisition unit 416 may be also referred to as "COM STATUS ACQ", the prediction unit 417 may be also referred to as "PREDICT", and the channel adjustment unit 418 may be also referred to as "CHANNEL ADJ".

The management unit 411 manages data transmitted and received by the wireless communication device 40. For example, the management unit 411 holds, in a volatile memory, data to be transmitted by the wireless communication device 40. Further, the management unit 411 holds, in the volatile memory, information requested to be received by the wireless communication device 40. The information requested to be received by the wireless communication device 40 may be information such as the capacity of firmware update data of an ECU of the subject vehicle HV, for example.

The first instruction unit 412 controls the timing of operating the identification information acquisition unit 413. It is preferable that the first instruction unit 412 does not operate the identification information acquisition unit 413 when there is no information that needs to be transmitted or received by the wireless communication device 40. The information that needs to be transmitted or received by the wireless communication device 40 can be rephrased as information required to be transmitted or received. When the management unit 411 does not hold information that needs to be transmitted or received, the first instruction unit 412 may determine that there is no information required to be transmitted or received. On the other hand, it is preferable that the first instruction unit 412 causes the identification information acquisition unit 413 to operate when there is information required to be transmitted or received. The first instruction unit 412 may inquire of the management unit 411 about the presence or absence of information that needs to be transmitted or received. When the management unit 411 holds information that needs to be transmitted or received, it may be determined that there is information to be transmitted or received.

Hereinafter, an example of a case where the first instruction unit 412 causes the identification information acquisition unit 413 to operate when there is information required to be transmitted or received will be described. Note that the first instruction unit 412 may periodically give an instruction to operate the identification information acquisition unit 413.

The identification information acquisition unit 413 acquires identification information for identifying an access point of a predetermined wireless network (hereinafter referred to as a target network) existing on a route of the subject vehicle HV when instructed by the first instruction unit 412. That is, the identification information acquisition unit 413 acquires the identification information when there is the information required to be transmitted or received. The identification information acquisition unit 413 may not acquire the identification information when there is no information required to be transmitted or received. Accordingly, it may be possible to reduce the waste of acquiring the identification information for transmission or reception even though there is no information required to be transmitted or received. This process by the identification information acquisition unit 413 corresponds to an identification information acquisition process. In the present embodiment, an example of a case where the target network is the Wi-Fi network will be described as bellow.

The identification information acquired by the identification information acquisition unit 413 may be, for example, position information of the access point, output power, average communication speed, or the like. The identification information may be any information that can identify the access point of the target network existing on the route of the subject vehicle HV. The identification information acquisition unit 413 may acquire the identification information via any of the WF communication unit 430, the CL communication unit 440, and the V2X communication unit 450.

When acquiring the identification information via the WF communication unit 430, the identification information acquisition unit 413 may perform the following. The identification information acquisition unit 413 causes the WF communication unit 430 to download the identification information about the Wi-Fi spot from the server 2 within the communication range of the access point of the Wi-Fi network (hereinafter referred to as a Wi-Fi spot). Then, the identification information acquisition unit 413 may acquire the identification information downloaded by the WF communication unit 430. In order to reduce the communication load, the identification information acquisition unit 413 may cause the WF communication unit 430 to download, for example, only identification information about Wi-Fi spots within a certain distance from the subject vehicle HV. In this case, the identification information acquisition unit 413 sends a vehicle position of the subject vehicle HV measured by the locator 41 from the WF communication unit 430 to the server 2. Thereby, only the identification information about Wi-Fi spots within the certain distance from the subject vehicle HV may be downloaded.

When acquiring the identification information via the CL communication unit 440, the identification information acquisition unit 413 may perform the following. The identification information acquisition unit 413 causes the CL communication unit 440 to download the identification information about the Wi-Fi spot from the server 2 by the cellular communication. Then, the identification information acquisition unit 413 may acquire the identification information downloaded by the CL communication unit 440. In order to reduce the communication load, the identification information acquisition unit 413 may cause the CL communication unit 440 to download, for example, only identification information about Wi-Fi spots within a certain distance from the subject vehicle HV. In this case, the identification information acquisition unit 413 sends the vehicle position of the subject vehicle HV measured by the locator 41 from the CL communication unit 440 to the server 2. Thereby, only the identification information about Wi-Fi spots within the certain distance from the subject vehicle HV may be downloaded.

When acquiring the identification information via the V2X communication unit 450, the identification information acquisition unit 413 may perform the following. The identification information acquisition unit 413 causes the V2X communication unit 450 to receive the identification information about the Wi-Fi spot via the inter-vehicle communication or the road-to-vehicle communication. Then, the identification information acquisition unit 413 may acquire the identification information received by the V2X communication unit 450. When acquiring the identification information via the V2X communication unit 450, the identification information may be acquired from the wireless communication device 3 of the different vehicle OV that is performing Wi-Fi communication with the Wi-Fi spot by the inter-vehicle communication using the 700 MHz band that is communicable over a relatively long distance.

The point identification unit 414 uses the identification information acquired by the identification information acquisition unit 413 to identify the Wi-Fi spot existing on the route of the subject vehicle HV. An on-route access point such as the Wi-Fi spot existing on the route of the subject vehicle HV is hereinafter referred to as an on-route AP. This process of the point identification unit 414 corresponds to a point identification process. The process by the point identification unit 414 may start when the identification information acquisition unit 413 acquires the identification information. That is, the process for identifying the on-route AP by the point identification unit 414 may not start until the identification information acquisition unit 413 acquires the identification information.

As the route of the subject vehicle HV, the recommendation route determined by the ADECU 43 may be used while the subject vehicle HV is automatically driving along the recommendation route. Further, when the subject vehicle HV receives the route guidance from the NAVI 42, the recommendation route used for the route guidance may be used as the route of the subject vehicle HV. Further, when none of these cases apply, a route on which the subject vehicle HV travels frequently may be estimated and used as the route of the subject vehicle HV based on a travel history of the subject vehicle HV.

Further, the point identification unit 414 may estimate whether the amount of information required to be transmitted or received exceeds the amount of information that can be transmitted or received at the time of passing through at the Wi-Fi spot (hereinafter referred to as a transmittable-receivable information amount). The point identification unit 414 may estimate the transmittable-receivable information amount as below, for example. First, based on a vehicle speed of the subject vehicle HV detected by the vehicle speed sensor of the vehicle sensors 44 and an area of the Wi-Fi spot where the vehicle is estimated to pass, a staying time of the subject vehicle HV at the Wi-Fi spot is estimated. Then, the transmittable-receivable information amount can be estimated from the average communication speed of the on-route AP and the estimated staying time in the identification information acquired by the identification information acquisition unit 413. Further, it may be possible to inquire of the management unit 411 about information required to be transmitted or received.

When the identification information does not include the average communication speed of the on-route AP, the average communication speed can be estimated from information that is included in the identification information and can be used for estimation of the average communication speed of the on-route AP. For example, the average communication speed may be estimated from information such as electric field intensity and used.

Also, the information required to be transmitted or received may be in units of fragments divided by fragmentation, as long as the information can be fragmented. The point identification unit 414 may obtain information of whether the information required to be transmitted or received can be fragmented by inquiring of the management unit 411. For example, the point identification unit 414 may estimate whether, in a case where the amount of information that is not divided by fragmentation exceeds the transmittable-receivable information amount, the information in units of fragments divided by fragmentation exceeds the transmittable-receivable information amount.

The second instruction unit 415 controls the timing of operating the communication status acquisition unit 416. The second instruction unit 415 determines the timing at which the subject vehicle HV comes close to the communication range of the on-route AP identified by the point identification unit 414. Then, the second instruction unit 415 may instruct the communication status acquisition unit 416 to operate at the timing when the subject vehicle HV comes close to the communication range of the on-route AP. The second instruction unit 415 does not instruct the communication status acquisition unit 416 to operate unless the subject vehicle HV comes close to the communication range of the on-route AP.

The second instruction unit 415 determines a timing when a distance between the on-route AP and the subject vehicle HV becomes equal to or less than a threshold distance, which is longer than the communication range of the on-route AP, as the timing when the subject vehicle HV comes close to the communication range of the on-route AP. As for the position of the on-route AP, the position indicated by the position information of the on-route AP in the identification information acquired by the identification information acquisition unit 413 may be used. As for the position of the subject vehicle HV, the vehicle position of the subject vehicle HV measured by the locator 41 may be used. The position of the on-route AP and the position of the subject vehicle HV may be represented by, for example, latitude and longitude coordinates. The communication range of the on-route AP may be estimated from the output power of the on-route AP in the identification information acquired by the identification information acquisition unit 413. The threshold distance may be a distance that can be said to be just before the subject vehicle HV enters the communication range (hereinafter referred to as target communication range) of the on-route AP corresponding to the determination of the timing when the vehicle comes close to the communication range. The threshold distance may be set so as to be estimated to be enough to complete the prediction by the prediction unit 417 after the communication status information for the target communication range is obtained before the subject vehicle HV enters the target communication range. The communication status information and the prediction unit 417 will be described later.

The second instruction unit 415 may determine a timing when at a time estimated to be a remaining time until the subject vehicle HV enters the communication range of the on-route AP becomes equal to or less than a threshold, as the timing when the subject vehicle HV comes close to the communication range of the on-route AP. The remaining time until the subject vehicle HV enters the communication range of the on-route AP may be estimated from the distance between the on-route AP and the subject vehicle HV, the communication range of the on-route AP, and the vehicle speed of the subject vehicle HV. The distance between the on-route AP and the subject vehicle HV may be set to a distance between the above-described position of the on-route AP and the position of the subject vehicle HV. This distance may be a straight distance or a distance along the route. As the vehicle speed of the subject vehicle HV, a detection result of the vehicle speed sensor of the vehicle sensors 44 may be used. The threshold time may be set to a time just before the subject vehicle HV enters the target communication range. The threshold time may be set so as to be estimated so that there is an enough time to complete the prediction by the prediction unit 417 after acquisition of the communication status information for the target communication range before the subject vehicle HV enters the target communication range. The communication status information and the prediction unit 417 will be described later.

Further, it is preferable that the second instruction unit 415 does not cause the communication status acquisition unit 416 to operate in a case where there is no information required to be transmitted or received even at the timing when the subject vehicle HV comes close to the target communication range. Accordingly, it may be possible to reduce the waste of acquiring the communication status information for transmission or reception even though there is no information required to be transmitted or received.

In addition, it is preferable that, even at the timing when the subject vehicle HV comes close to the target communication range, the second instruction unit 415 does not operate the communication status acquisition unit 416 in a case where the amount of information required to be transmitted or received exceeds the amount (hereinafter, transmittable-receivable information amount) of information that can be transmitted or received at the time when the subject vehicle HV passes through the target communication range. Whether the information required to be transmitted or received exceeds the transmittable-receivable information amount is estimated without the communication status information described later. Whether the amount of information required to be transmitted or received exceeds the transmittable-receivable information amount may be estimated by using a result by the point identification unit 414. Accordingly, it may be possible to reduce the waste of acquiring the communication status information for transmission or reception even though information required to be transmitted or received cannot be transmitted or received.

When instructed by the second instruction unit 415, the communication status acquisition unit 416 acquires communication status information regarding the communication status in the target communication range via wireless communication other than wireless communication with the Wi-Fi spot. The process by this communication status acquisition unit 416 corresponds to a communication status acquisition process. The communication status information acquired by the communication status acquisition unit 416 may be, for example, the number of terminals communicating within the target communication range, channels in use, electric field intensity of each channel, and the like. The communication status information may be any information that can identify the communication status in the target communication range. The communication status acquisition unit 416 may acquire communication status information via either the CL communication unit 440 or the V2X communication unit 450.

When the communication status acquisition unit 416 acquires communication status information via the CL communication unit 440, the following may be done. The communication status acquisition unit 416 causes the CL communication unit 440 to download the communication status information about the target communication range by sending, for example, position information of the Wi-Fi spot corresponding to target communication range from the CL communication unit 440 to the server 2. When the identification information acquired by the identification information acquisition unit 413 includes identification information for identifying the on-route AP, this identification information may be used instead of the position information. Note that the server 2 sequentially collects and holds the communication status information about each Wi-Fi spot of the Wi-Fi network.

When the communication status acquisition unit 416 acquires communication status information via the V2X communication unit 450, the following may be done. The communication status acquisition unit 416 causes the V2X communication unit 450 to receive communication status information about the target communication range via the inter-vehicle communication. Then, the communication status acquisition unit 416 may acquire the communication status information received by the V2X communication unit 450. When the communication status information is acquired via the V2X communication unit 450, the communication status acquisition unit 416 may acquire the communication status information about the target communication range from the wireless communication device 3 of the different vehicle OV that is performing the Wi-Fi communication with the Wi-Fi spot corresponding to the target communication range, by acquiring the communication status information via the inter-vehicle communication using 5.8 GHz that enables relatively short distance communication.

The prediction unit 417 uses the communication status information about the target communication range acquired by the communication status acquisition unit 416 to predict a frequency channel with less interference in wireless communication in the target communication range. This process by the prediction unit 417 corresponds to a prediction process. In one example, a channel that is not in use may be predicted as the frequency channel with less interference. Further, when there is channel in use, the channel with the lowest electric field intensity may be predicted as the frequency channel with less interference.

The channel adjustment unit 418 instructs the WF communication unit 430 to perform the Wi-Fi communication by using the channel predicted by the prediction unit 417 as the frequency channel with less interference. Thereby, it may be possible to predict the frequency channel with less interference in the target communication range before the subject vehicle HV reaches the target communication range.

<Data Acquisition-Related Process>

Figure 3:
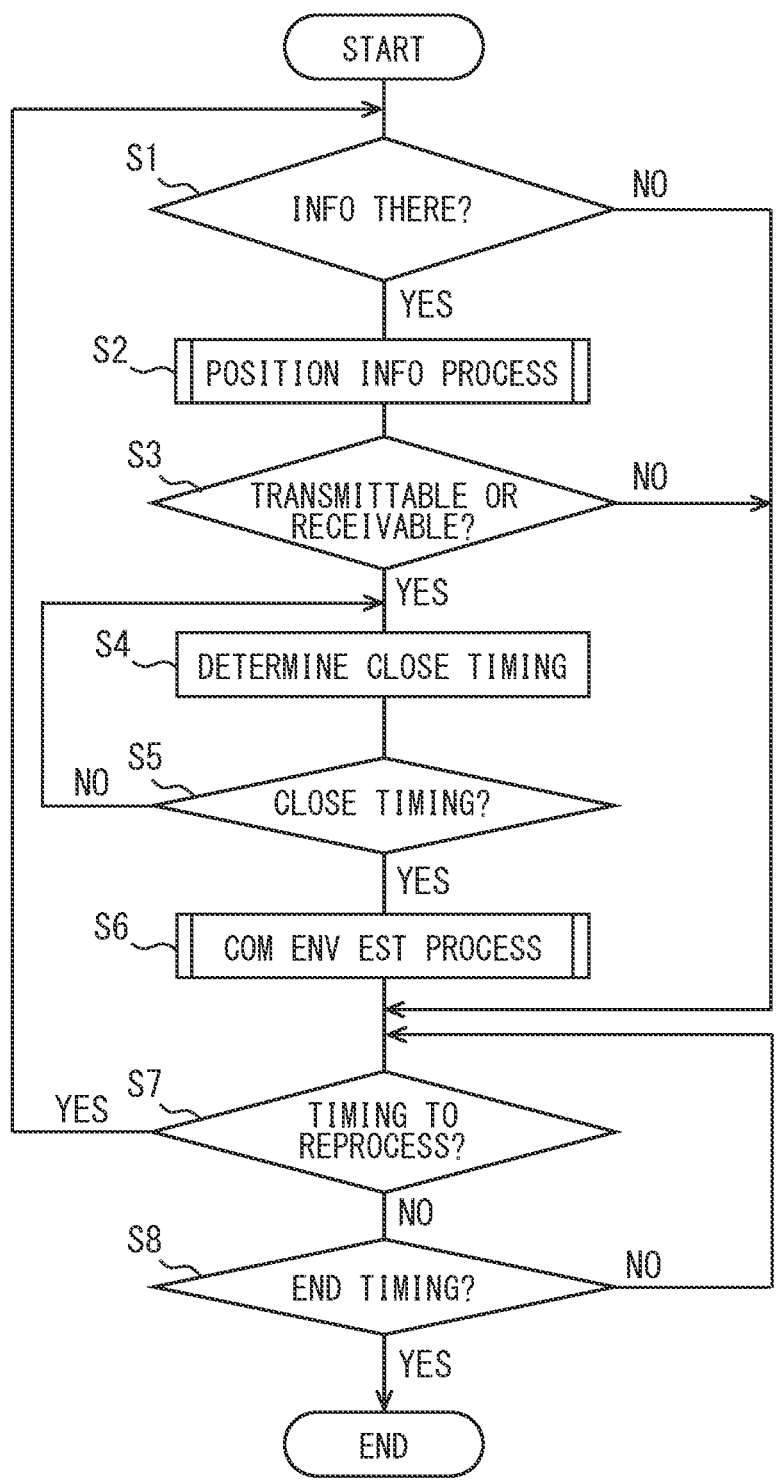
FIG. 3 is a flowchart showing one example of a flow of a prediction-related process of a controller.
Figure 4:
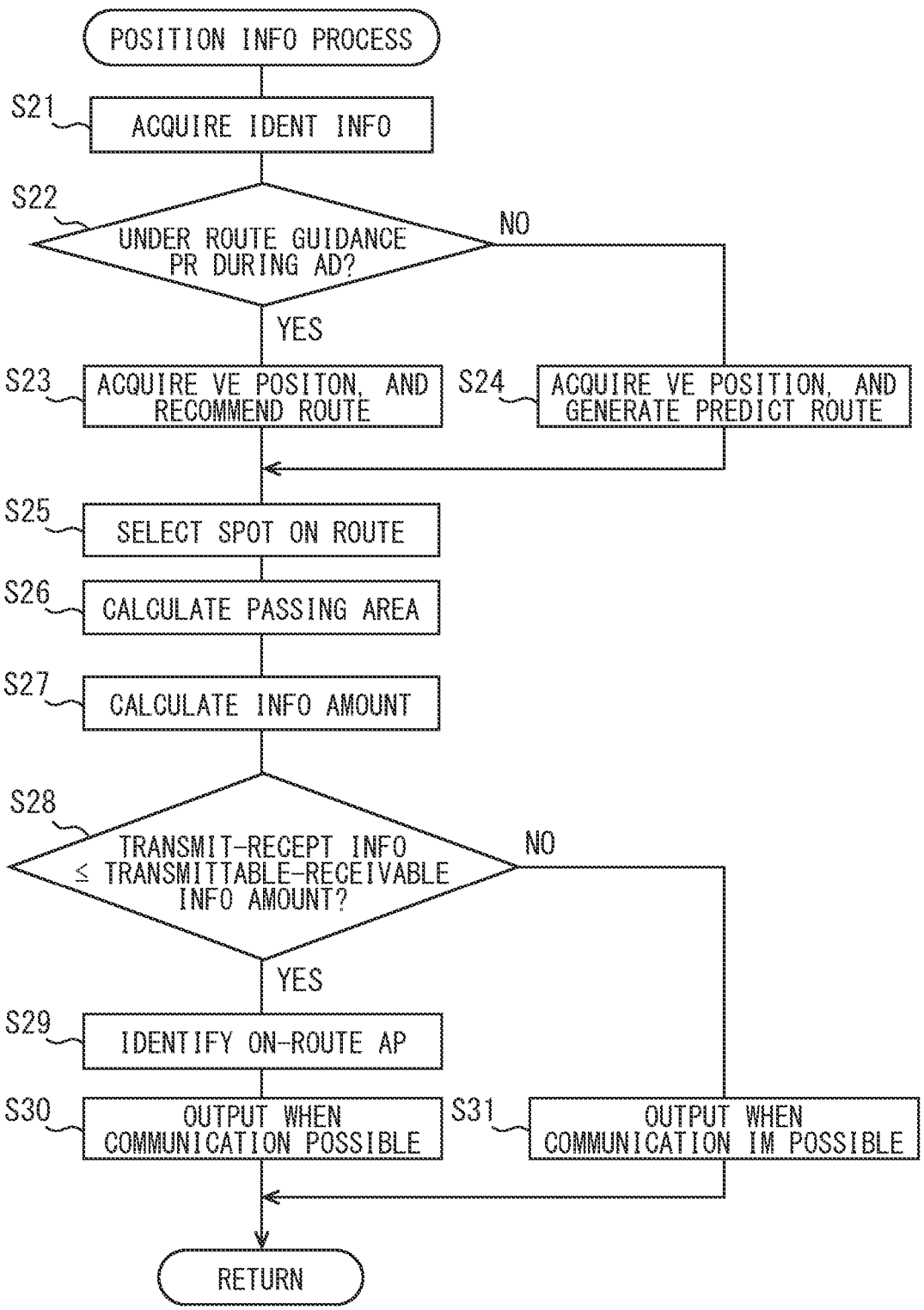
FIG. 4 is a flowchart showing one example of a flow of a position information process of the prediction-related process.
Figure 5:
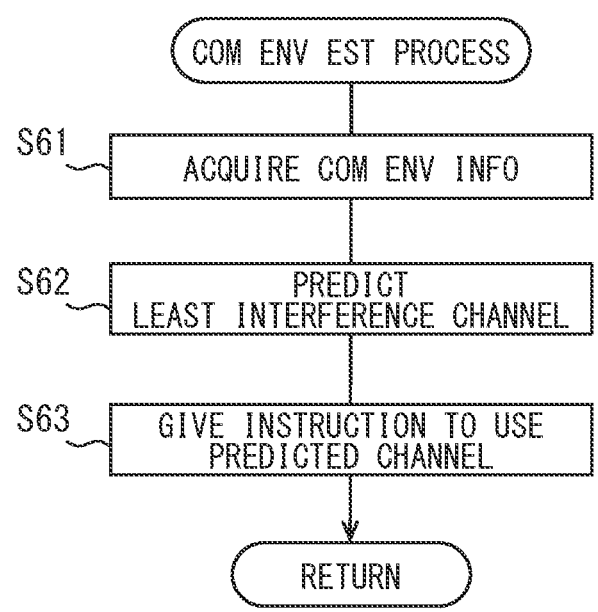
FIG. 5 is a flowchart showing one example of a flow of a communication environment estimation process of the prediction-related process.

Next, with reference to flowcharts of FIGS. 3 to 5, one example of a flow of a process related to prediction, by the controller 410, of the frequency channel with less interference in the target communication range (hereinafter, prediction-related process) will be described. The flowchart of FIG. 3 may start when a switch (hereinafter, power switch) for starting an internal combustion engine of the subject vehicle HV or a motor generator is turned on. In the drawings, the term of information may be also referred to as "INFO".

First, in S1, the first instruction unit 412 inquires of the management unit 411 about the presence or absence of information that needs to be transmitted or received. When there is information required be transmitted or received (YES in S1), the process shifts to S2. On the other hand, when there is no information required to be transmitted or received (NO in S1), the process shifts to S7. In the drawings, the information required to be transmitted or received may be also referred to as "TRABSMIT-RECEPT INFO".

In S2, the position information process is executed, and the process shifts to S3. Here, one example of a flow of the position information process will be described with reference to the flowchart of FIG. 4. In the drawings, the term of vehicle may be also referred to as "VE".

In S21, the identification information acquisition unit 413 acquires the identification information as described above. In S22, when the subject vehicle HV is under route guidance by the NAVI 42 or during automatic driving (that is, AD) (YES in S22), the process shifts to S23. On the other hand, when the subject vehicle HV is neither during route guidance by the NAVI 42 nor during AD (NO in S22), the process shifts to S24.

In S23, the point identification unit 414 acquires the vehicle position and route of the subject vehicle HV, and the process shifts to S25. As for the vehicle position, the latest vehicle position measured by the locator 41 is obtained. As for the recommendation route, when the subject vehicle HV is under the route guidance by the NAVI 42, the recommendation route used for this route guidance is acquired. On the other hand, when the subject vehicle HV is during the AD, the recommendation route used for this AD is acquired.

In S24, the point identification unit 414 identifies the vehicle position of the subject vehicle HV and generates a prediction route, and the process shifts to S25. As for the vehicle position, the latest vehicle position measured by the locator 41 is obtained. As for the prediction route, for example, a route with a high travel frequency may be generated as the prediction route based on the travel history of the subject vehicle.

Hereinafter, the recommendation route and the prediction route will be referred to as the route of the subject vehicle HV. The process in S21 may be executed in parallel with the processes in S22 to S24, or may be executed after the processes in S22 to S24.

In S25, the point identification unit 414 selects the Wi-Fi spot within a certain distance from the subject vehicle HV on the route of the subject vehicle HV based on the identification information acquired in S21 and the vehicle position and the route acquired in S23 or S24. The certain distance described here may be set to a distance that is arbitrarily settable, and may be, for example, a distance such that multiple Wi-Fi spots are selected.

In S26, the point identification unit 414 estimates the communication range of the Wi-Fi spot selected in S25 based on the output power in the identification information acquired in S21. Then, the point identification unit 414 calculates, for each Wi-Fi spot, an area (hereinafter referred to as a passing area) overlapping with the communication range of the Wi-Fi spot on the route of the subject vehicle HV.

In S27, the point identification unit 414 calculates, for each Wi-Fi spot, the amount (that is, the transmittable-receivable information amount as described above) of information that can be transmitted or received when the subject vehicle HV passes through the passing area calculated in S26. As an example, the following may be done. First, the point identification unit 414 estimates the staying time of the vehicle HV in the passing area based on the vehicle speed of the subject vehicle HV detected by the vehicle speed sensor of the vehicle sensor 44 and the passing area calculated in S26. Then, the amount of information that can be transmitted or received at the time of passing through the passing area may be estimated from the average communication speed of the on-route AP and the calculated staying time in the identification information acquired by the identification information acquisition unit 413. The amount of information that can be transmitted or received may be calculated for each passing area. That is, the amount can be calculated for each Wi-Fi spot.

In S28, the point identification unit 414 estimates whether the amount of information required to be transmitted or received is within the transmittable-receivable information amount. For information that cannot be fragmented, when there is a Wi-Fi spot estimated to be able to transmit or receive the entire of information required to be transmitted or received at the time of passing through the passing area, the information required to be transmitted or received may be estimated to be within the transmittable-receivable information amount. For information that cannot be fragmented, for each fragment of information required to be transmitted or received, when there are multiple Wi-Fi spots estimated to be able to transmit or receive the entire of information required to be transmitted or received at the time of passing through the passing area, the information required to be transmitted or received may be estimated to be within the transmittable-receivable information amount. In S28, when it is estimated that the information required to be estimated or received is within the transmittable-receivable information amount (YES in S28), the process shifts to S29. On the other hand, when it is estimated that the information required to be estimated or received is not within the transmittable-receivable information amount (NO in S28), the process shifts to S31.

In S29, the point identification unit 414 identifies the Wi-Fi spot estimated in S28 as the on-route AP when the amount of information required to be transmitted or received is within the transmittable-receivable information amount. In S30, the point identification unit 414 performs output at a time when the communication is possible, and the process shifts to S3. In the output at the time when the communication is possible, for example, the output indicating that the information required to be transmitted or received can be transmitted or received, the identified on-route AP, or the like are given to the second instruction unit 415.

In S31, the point identification unit 414 performs output at a time when the communication is not possible, and the process shifts to S3. In the output at the time when the communication is not possible, for example, output indicating that the information required to be transmitted or received cannot be transmitted or received is given to the second instruction unit 415.

Returning to FIG. 3, when the second instruction unit 415 receives the output indicating that the information required to be transmitted or received can be transmitted or received (YES in S3), the process shifts to S4. On the other hand, when the second instruction unit 415 receives the output indicating that the information required to be transmitted or received cannot be transmitted or received (NO in S3), the process shifts to S7.

In S4, the second instruction unit 415 determines the timing at which the subject vehicle HV comes close to the target communication range. The target communication range is set to a communication range of the on-route AP identified in S2. In S5, when it is the timing at which the subject vehicle HV comes close to the target communication range (YES in S5), the process shifts to S6. On the other hand, when it is not the timing at which the subject vehicle HV comes close to the communication range of the on-route AP identified in S2 (NO in S5), the process returns to S4 and repeats.

In S6, the communication environment estimation process is executed, and the process shifts to S7. Here, one example of a flow of the communication environment estimation process will be described with reference to a flowchart of FIG. 6.

In S61, the communication status acquisition unit 416 acquires communication status information regarding the communication status in the target communication range via wireless communication other than wireless communication with the Wi-Fi spot. In S62, the prediction unit 417 uses the communication status information about the target communication range acquired in S61 to predict a frequency channel (hereinafter, least interference channel) with less interference in wireless communication in the target communication range.

In S63, the channel adjustment unit 418 instructs the WF communication unit 430 to perform Wi-Fi communication using the channel predicted as the least interference channel in S62, and the process shifts to S7.

Returning to FIG. 3, in S7, when it is a timing to reprocess the data acquisition-related process (YES in S7), the process returns to S1 and repeats. On the other hand, when it is not the timing to reprocess the data acquisition-related process (NO in S7), the process shifts to S8. Examples of the timing to reprocess the data acquisition-related process include resetting the route and traveling a certain distance after the previous process in S1.

In S8, when it is the end timing of the data acquisition-related process (YES in S8), the data acquisition-related process ends. On the other hand, it is not the end timing of the data acquisition-related process (NO in S8), the process returns to S7, and repeats. Examples of the end timing of the data acquisition-related process include a timing when the power switch is turned off, and the like.

<Overview of First Embodiment>

According to the configuration of the first embodiment, with use of the communication status information acquired at the timing when the subject vehicle HV comes close to the communication range of the Wi-Fi spot on the route of the subject vehicle HV, the frequency channel with less interference in the wireless communication in the target communication range that is communication range to which the subject vehicle HV comes close is predicted. Accordingly, it may be possible to predict the frequency channel with less interference in the communication range before the subject vehicle HV reaches the communication range of the Wi-Fi spot on the route. Further, since the communication status information is acquired at the timing when the vehicle comes close to the target communication range, it may be possible to reduce a time period from the time of acquiring the communication status information to the time when the vehicle enters the target communication range. Accordingly, it may be possible to reduce the divergence between the acquired communication status information and the communication status information at the time of entering the target communication range. Hence, it may be possible to suppress deterioration in prediction accuracy of the frequency channel with less interference in the wireless communication in the target communication range. As the result, it may be possible to high accurately predict the frequency channel with less interference in the communication range of the Wi-Fi spot before the vehicle reaches the communication range of the Wi-Fi spot.

Second Embodiment

Although the first embodiment shows the configuration that does not operate the communication status acquisition unit 416 when it is determined that the information required to be transmitted or received exceeds the transmittable-receivable information amount of the Wi-Fi spot on the route of the subject vehicle HV, a different configuration may be employed. For example, a configuration (hereinafter, second embodiment) that does not operate the communication status acquisition unit 416 according to the vehicle speed of the subject vehicle HV may be employed. Hereinafter, one example of the second embodiment will be described with reference to the drawings.

The vehicle communication system 1 of the second embodiment is the similar to the vehicle communication system 1 of the first embodiment, except that a vehicle unit 4a is included instead of the vehicle unit 4.

<Schematic Configuration of Vehicle Unit>

Figure 6:
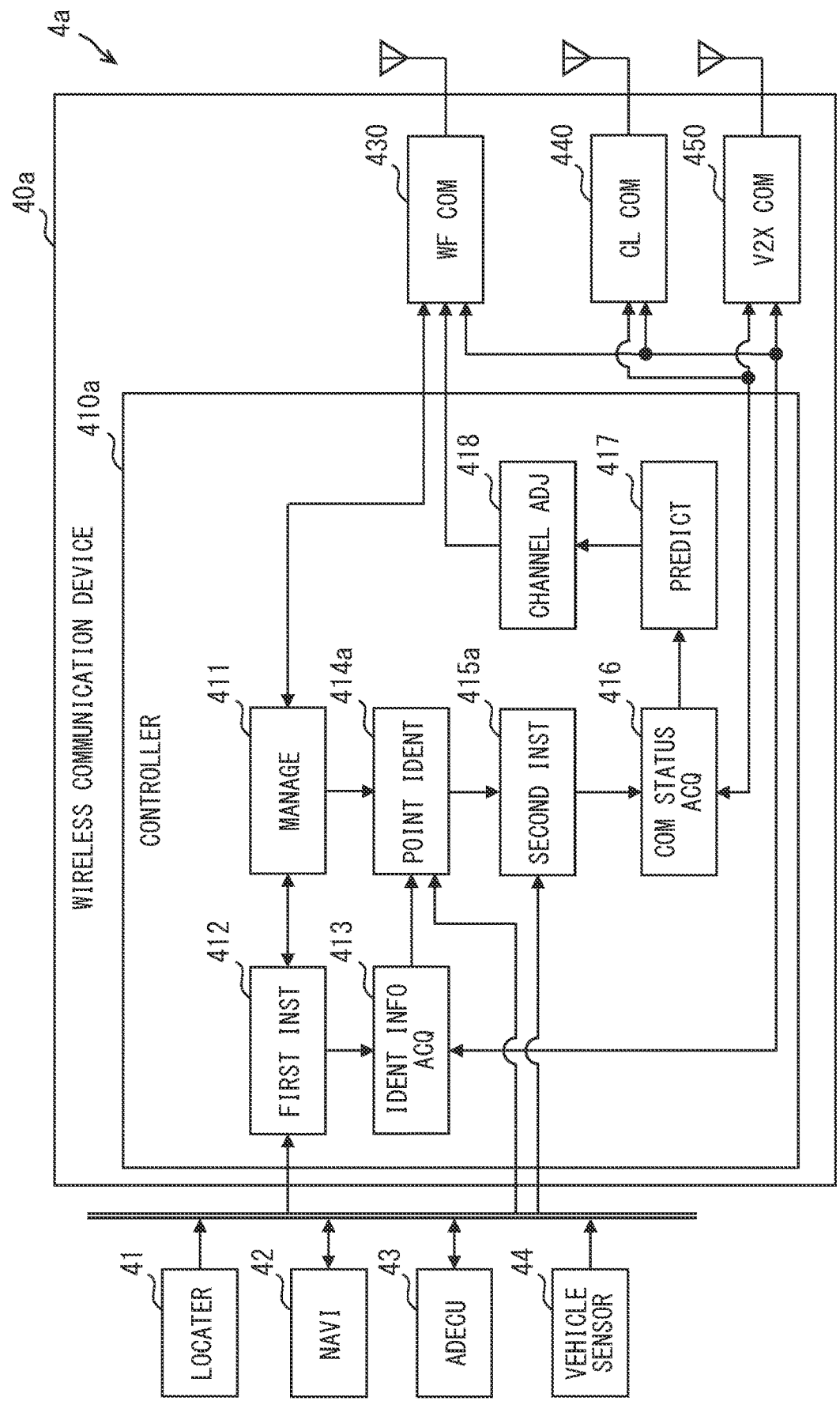
FIG. 6 is a diagram showing one example of schematic configurations of a vehicle unit and a wireless communication device.

First, a schematic configuration of the vehicle unit 4a will be described with reference to FIG. 6. As shown in FIG. 6, the vehicle unit 4a includes a wireless communication device 40a, the locator 41, the NAVI 42, the ADECU 43, and the vehicle sensor 44. The vehicle unit 4a is the similar to the vehicle unit 4 of the first embodiment except that the vehicle unit 4a includes a wireless communication device 40a instead of the wireless communication device 40.

<Schematic Configuration of Wireless Communication Device>

Next, a schematic configuration of the wireless communication device 40a will be described with reference to FIG. 6. As shown in FIG. 6, the wireless communication device 40a includes a controller 410a, the WF communication unit 430, the CL communication unit 440, and the V2X communication unit 450. The wireless communication device 40a is similar to the wireless communication device 40 of the first embodiment, except that the wireless communication device 40a includes the controller 410a instead of the controller 410.

<Schematic Configuration of Controller>

Next, a schematic configuration of the controller 410a will be described with reference to FIG. 6. As shown in FIG. 6, the controller 410a includes the management unit 411, the first instruction unit 412, the identification information acquisition unit 413, a point identification unit 414a, a second instruction unit 415a, the communication status acquisition unit 416, the prediction unit 417, and the channel adjustment unit 418 as functional blocks. The controller 410a is similar to the controller 410 of the first embodiment, except that the controller 410a includes the point identification unit 414a and the second instruction unit 415a instead of the point identification unit 414 and the second instruction unit 415. This controller 410a corresponds to the wireless communication control device. Execution of each functional block of the controller 410*a* by the computer also corresponds to execution of the wireless communication control method.

The point identification unit 414*a* corresponds to the point identification unit 414 of the first embodiment, except that it is not estimated whether the information required to be transmitted or received exceeds the transmittable-receivable information amount at the time of passing the Wi-Fi spot.

The second instruction unit 415*a* is similar to the second instruction unit 415 of the first embodiment, except that the communication status acquisition unit 416 does not operate when the vehicle speed of the subject vehicle HV is not within a predetermined threshold range, instead of no operation of the communication status acquisition unit 416 when it is determined that the information required to be transmitted or received exceeds the transmittable-receivable information amount at the time of passing the target communication range. Here, a process of the second instruction unit 415*a* is different form the process of the second instruction unit 415 of the first embodiment, and will be described.

The second instruction unit 415*a* does not cause the communication status acquisition unit 416 to operate when the vehicle speed of the subject vehicle HV is not within the predetermined threshold range even at the timing when the subject vehicle HV comes close to the target communication range. This is because, when the vehicle speed of the subject vehicle HV is too fast, it is estimated that there is no allowance for transmitting or receiving the information required to be transmitted or received in the target communication range, and it is useless to acquire the communication status information for transmission or reception. Further, when the vehicle speed of the subject vehicle HV is too slow, regardless of the communication status, it is estimated that there is allowance for transmitting or receiving the information required to be transmitted or received in the target communication range, and there is no need to acquire the communication status information for transmission or reception. In such a manner, according to the above configuration, it may be possible to reduce the waste of acquiring communication status information when it is not necessary to acquire communication status information for transmission or reception. The second instruction unit 415*a* may acquire, as the vehicle speed of the subject vehicle HV, a value detected by the vehicle speed sensor of the vehicle sensors 44.

The predetermined threshold range may be set to, for example, arbitrarily settable value. The upper limit value of the predetermined threshold range may be set to a vehicle speed value that is high so that it is estimated that there is no allowance for transmitting or receiving information required to be transmitted or received within the target communication range. The lower limit value of the predetermined threshold range may be set to a value for discriminating the value from the low-speed value estimated to generate allowance for transmitting or receiving information at the time of passing through this communication range without prediction of the communication environment within the target communication range. In other words, this lower limit value may be set to a lower limit value for discriminating the value from the low-speed value estimated to be high possibility to generate allowance for transmitting or receiving information even when the transmission or reception is performed in a case where the interference is eliminated without change of channel after prediction of the frequency channel with less interference.

The upper and lower limit values of the predetermined threshold range may be fixed values. Further, the upper and lower limit values of the predetermined threshold range may be variable values set according to the amount of information required to be transmitted or received. The upper and lower limit values of the predetermined threshold range according to the information amount of the information required to be transmitted or received may be set by using a mathematical expression showing a relationship between the information amount of the information required to be transmitted or received and the upper and lower limit values of the threshold range, a map, and the like that are stored in advance in the memory of the controller 410*a*. Note that the predetermined threshold range is not limited to having the upper limit value and the lower limit value. For example, the threshold range may have only the upper limit value, or the threshold range may have only the lower limit value.

<Data Acquisition-Related Process>

Figure 7:
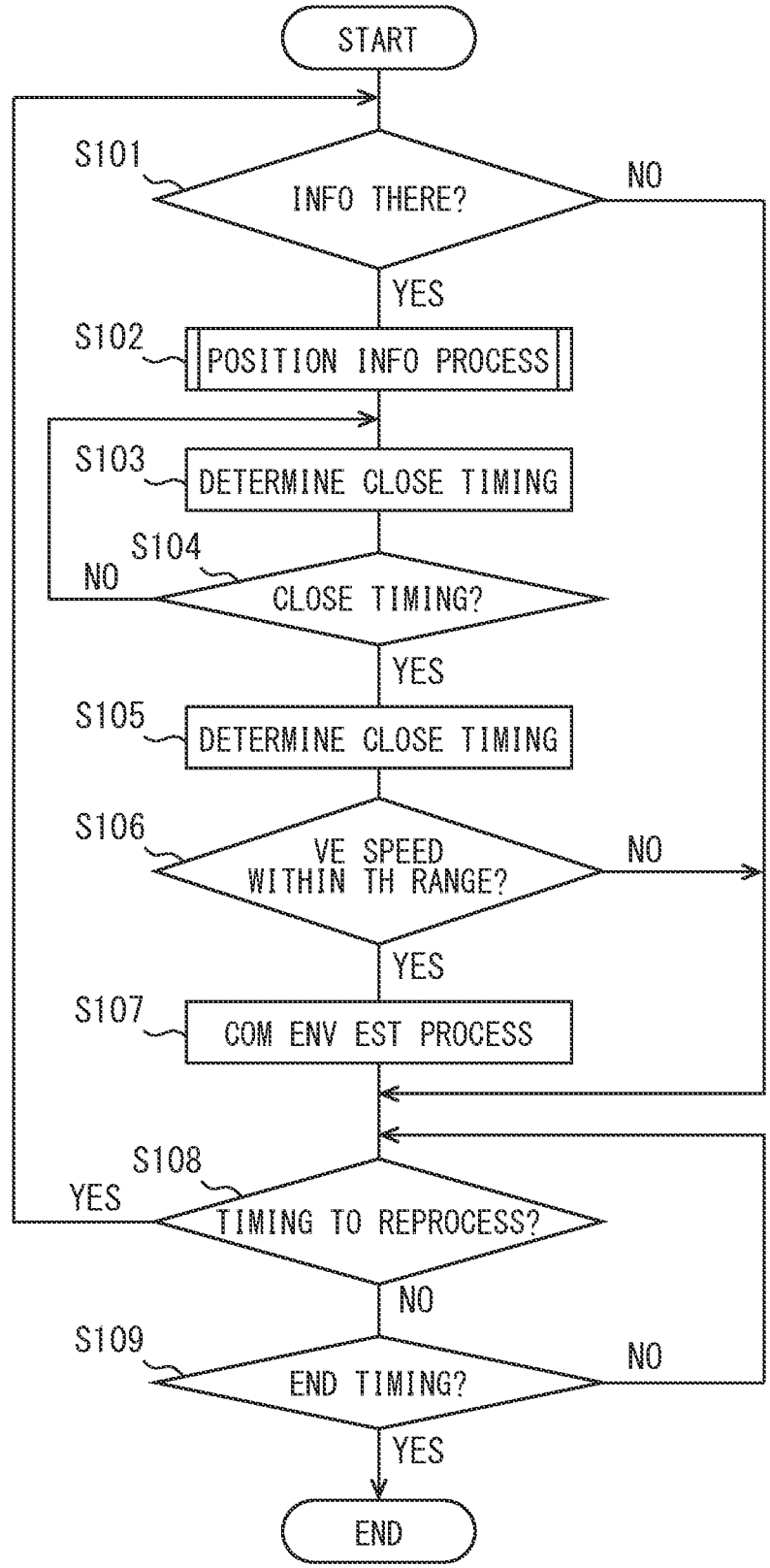
FIG. 7 is a flowchart showing one example of a flow of a prediction-related process of a controller.
Figure 8:
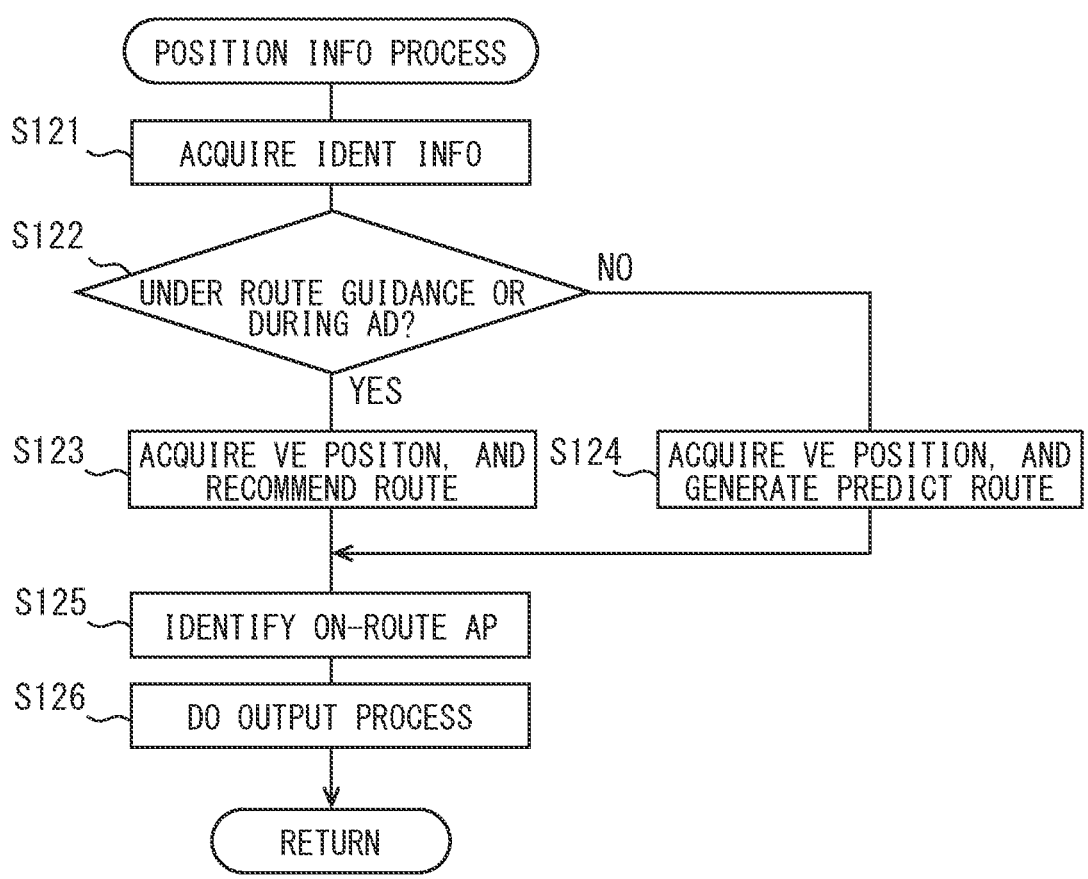
FIG. 8 is a flowchart showing one example of a flow of the position information process according to a second embodiment.

Next, one example of a flow of the prediction-related process by the controller 410*a* will be described with reference to flowcharts of FIGS. 7 and 8. The flowchart of FIG. 7 may start when the power switch is turned on, like the flowchart of FIG. 3.

In S101, the similar process to S1 is executed. When there is information required to be transmitted or received (YES in S101), the process shifts to S102. On the other hand, when there is no information required to be transmitted or received (NO in S101), the process shifts to S108.

In S2, the position information process is executed, and the process shifts to S3. Here, one example of a flow of the position information process according to the second embodiment will be described with reference to the flowchart of FIG. 8.

Processes in S121 to S124 are similar to the processes in S21 to S24. In S125, similarly to S25, the point identification unit 414*a* selects the Wi-Fi spot within a certain distance from the subject vehicle HV on the route of the subject vehicle HV based on the identification information acquired in S121 and the vehicle position and the route acquired in S123 or S124. Then, the selected Wi-Fi spot is identified as the on-route AP. In S126, the point identification unit 414*a* executes the output process, and the process shifts to S103. In the output process, the identified on-route AP or the like is output to the second instruction unit 415*a*.

Returning to FIG. 7, in S103, the second instruction unit 415*a* determines the timing at which the subject vehicle HV comes close to the target communication range. The target communication range is set to a communication range of the on-route AP identified in S102. In S104, when it is the timing at which the subject vehicle HV comes close to the target communication range (YES in S104), the process shifts to S105. On the other hand, when it is not the timing at which the subject vehicle HV comes close to the communication range of the on-route AP identified in S102 (NO in S104), the process returns to S103 and repeats.

In S105, the second instruction unit 415*a* acquires the vehicle speed of the subject vehicle HV. In S106, the second instruction unit 415*a* determines whether the vehicle speed acquired in S105 is within the predetermined threshold range. Then, when the vehicle speed is within the predetermined threshold range (YES in S106), the process shifts to S107. On the other hand, when the vehicle speed is not within the predetermined threshold range (NO in S106), the process shifts to S108.

In S107, similarly to S6, the communication environment estimation process is executed, and the process shifts to S108. In S108, similarly to S7, when it is the timing to reprocess the data acquisition-related process (YES in S108), the process returns to S101 and repeats. On the other hand, when it is not the timing to reprocess the data acquisition-related process (NO in S108), the process shifts to S109.

In S109, similarly to S8, when it is the end timing of the data acquisition-related process (YES in S109), the data acquisition-related process ends. On the other hand, it is not the end timing of the data acquisition-related process (NO in S109), the process returns to S108, and repeats.

According to the configuration of the second embodiment also, it may be possible to predict the frequency channel with less interference in the communication range before the subject vehicle HV reaches the communication range of the Wi-Fi spot on the route. Accordingly, it may be possible to high accurately predict the frequency channel with less interference in the communication range of the Wi-Fi spot before reaching the communication range of the Wi-Fi spot.

Third Embodiment

In the above-described embodiment, the configuration in which the target network is a Wi-Fi network has been described. However, the configuration is not necessarily limited to this. The target network may be another wireless network as long as it is a wireless network that can be connected by wireless communication with the access point within the communication range of the access point. For example, a configuration that the target network is a 5G wireless network or the like may be employed.

Note that the present disclosure is not limited to the embodiments described above and can variously be modified within the scope of the disclosure. An embodiment obtained by appropriately combining the technical features disclosed in the different embodiments is also included in the technical scope of the present disclosure. The controller and the method thereof described in the present disclosure may be implemented by a special purpose computer which includes a processor programmed to execute one or more functions executed by a computer program. Alternatively, the device and the method thereof described in the present disclosure may be implemented by a special purpose hardware logic circuit. Alternatively, the device and the method thereof described in the present disclosure may be implemented by one or more special purpose computers configured by a combination of a processor executing a computer program and one or more hardware logic circuits. The computer program may also be stored in a computer-readable non-transitory tangible storage medium as instructions to be executed by a computer.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

The invention claimed is:

1. A wireless communication control device configured to control a wireless communication device that is mounted on a vehicle and is configured to transmit and receive information via wireless communication with an access point of a wireless network, the wireless communication control device comprising:
an identification information acquisition unit configured to acquire identification information for identifying the access point of a target network that is a predetermined wireless network existing on a route of the vehicle;
a point identification unit configured to identify an on-route access point that is the access point of the target network on the route of the vehicle by using the identification information acquired by the identification information acquisition unit;
a communication status acquisition unit configured to acquire communication status information regarding a communication status in a target communication range that is a communication range to which the vehicle comes close, via wireless communication other than the wireless communication with the access point of the target network, at a timing when the vehicle comes close to a communication range of the on-route access point identified by the point identification unit; and
a prediction unit configured to predict a frequency channel with less interference in the wireless communication in the target communication range by using the communication status information acquired by the communication status acquisition unit.

2. The wireless communication control device according to claim 1, wherein
the identification information acquisition unit does not acquire the identification information when there is not information that needs to be transmitted or received by the wireless communication device, and
the identification information acquisition unit acquires the identification information when there is the information that needs to be transmitted or received by the wireless communication device.

3. The wireless communication control device according to claim 1, wherein
the communication status acquisition unit does not acquire the communication status information when there is not information that needs to be transmitted or received by the wireless communication device, and
the communication status acquisition unit acquires the communication status information when there is information that needs to be transmitted or received by the wireless communication device.

4. The wireless communication control device according to claim 3, wherein
the communication status acquisition unit does not acquire the communication status information in the target communication range when the point identification unit determines, without using the communication status information, that an amount of the information that needs to be transmitted or received by the wireless communication device exceeds an amount of information that is transmittable or receivable at a time when the vehicle passes through the target communication range, and
the communication status acquisition unit acquires the communication status information in the target communication range when the point identification unit determines, without using the communication status information, that the amount of the information that needs to be transmitted or received by the wireless communication device does not exceed the amount of the information that is transmittable or receivable at the time when the vehicle passes through the target communication range.

5. The wireless communication control device according to claim 3, wherein
the communication status acquisition unit does not acquire the communication status information in the target communication range when a vehicle speed of the vehicle is not within a predetermined threshold range even at a timing when the vehicle comes close to the target communication range, and the communication status acquisition unit acquires the communication status information in the target communication range when the vehicle speed of the vehicle is within the predetermined threshold range at a timing when the vehicle comes close to the target communication range.

6. The wireless communication control device according to claim 1, wherein
the communication status acquisition unit is configured to determine a timing when a distance between the on-route access point identified by the point identification unit and the vehicle is equal to or less than a threshold distance longer than the communication range of the on-route access point as a timing when the vehicle comes close to the target communication range, and acquire the communication status information in the target communication range.

7. The wireless communication control device according to claim 1, wherein
the communication status acquisition unit is configured to determine a timing when a time estimated to be a remaining time until the vehicle enters the communication range of the on-route access point identified by the point identification unit becomes equal to or less than a threshold time as a timing when the vehicle comes close to the target communication range, and
acquire the communication status information regarding the communication status in the target communication range.

8. The wireless communication control device according to claim 1, wherein
the frequency channel with less interference is a frequency channel that is not in use.

9. The wireless communication control device according to claim 1, further comprising
a processor that serves as the point identification unit, the communication status acquisition unit, and the prediction unit.

10. A wireless communication device that is mounted on a vehicle and is configured to transmit and receive information via wireless communication with an access point of a wireless network, the device comprising:
a first communication unit configured to perform the wireless communication with the access point;
a second communication unit configured to perform wireless communication other than the wireless communication with the access point; and
a wireless communication control device that includes:
an identification information acquisition unit configured to acquire identification information for identifying the access point of a target network that is a predetermined wireless network existing on a route of the vehicle;
a point identification unit configured to identify an on-route access point that is the access point of the target network on the route of the vehicle by using the identification information acquired by the identification information acquisition unit;
a communication status acquisition unit configured to acquire communication status information regarding a communication status in a target communication range that is a communication range to which the vehicle comes close, via wireless communication other than the wireless communication with the access point of the target network, at a timing when the vehicle comes close to a communication range of the on-route access point identified by the point identification unit; and
a prediction unit configured to predict a frequency channel with less interference in the wireless communication in the target communication range by using the communication status information acquired by the communication status acquisition unit.

11. The wireless communication device according to claim 10, further comprising:
a first processor that serves as the first communication unit and the second communication unit; and
a second processor that serves the point identification unit, the communication status acquisition unit, and the prediction unit.

12. A wireless communication control method that is executed by at least one processor and controls a wireless communication device that is mounted on a vehicle and is configured to transmit and receive information via wireless communication with an access point of a wireless network, the method comprising:
acquiring identification information for identifying the access point of a target network that is a predetermined wireless network existing on a route of the vehicle;
identifying an on-route access point that is the access point of the target network on the route of the vehicle by using the acquired identification information;
acquiring communication status information regarding a communication status in a target communication range that is a communication range to which the vehicle comes close, via wireless communication other than the wireless communication with the access point of the target network, at a timing when the vehicle comes close to a communication range of the identified on-route access point; and
predicting a frequency channel with less interference in the wireless communication in the target communication range by using the acquired communication status information.

* * * * *